March 7, 1933. A. O. JAEGER 1,900,382
CATALYTIC APPARATUS
Filed Feb. 23, 1928  9 Sheets-Sheet 1

INVENTOR.
Alphons O. Jaeger
ATTORNEY

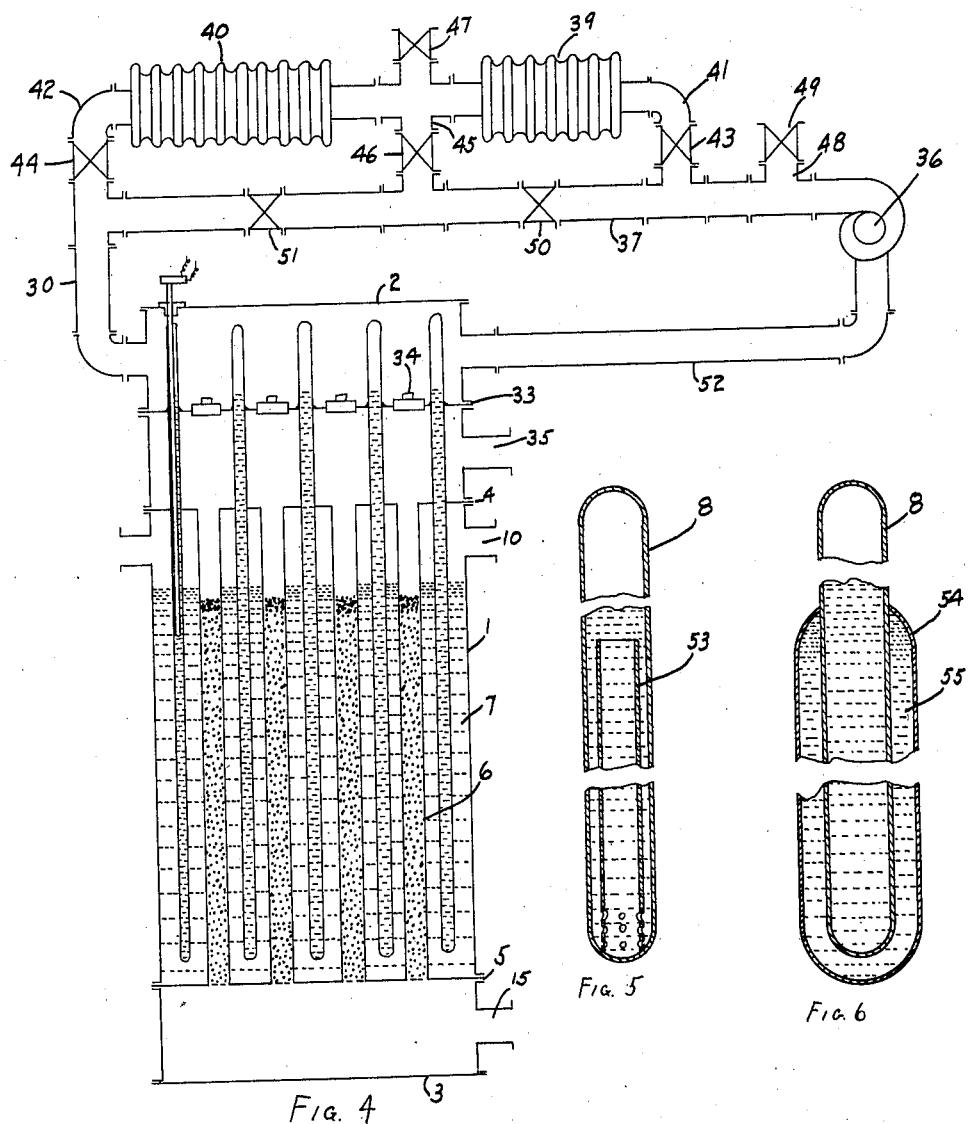

March 7, 1933.  A. O. JAEGER  1,900,382
CATALYTIC APPARATUS
Filed Feb. 23, 1928    9 Sheets-Sheet 8
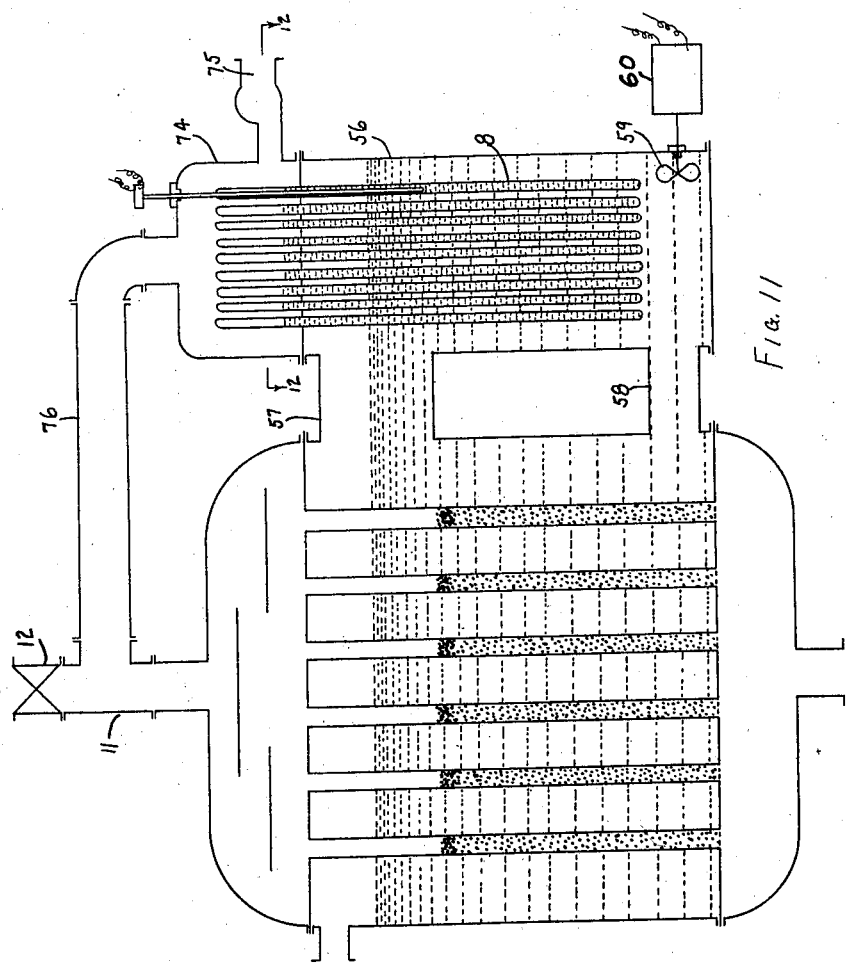
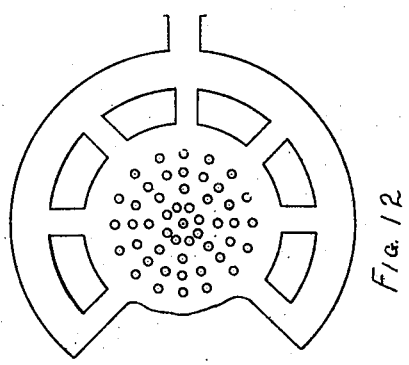
INVENTOR.
Alphons O. Jaeger
BY Robert Ames Norton
ATTORNEY March 7, 1933.    A. O. JAEGER    1,900,382
CATALYTIC APPARATUS
Filed Feb. 23, 1928    9 Sheets-Sheet 9
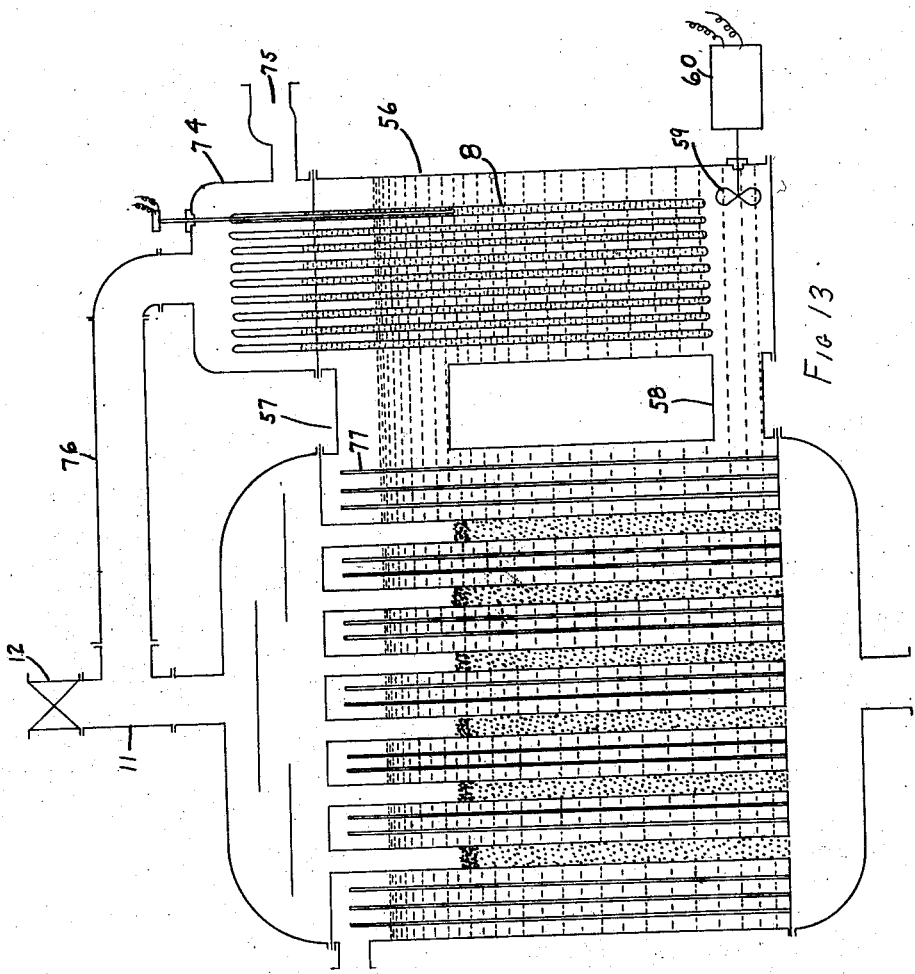
INVENTOR.
Alphons O. Jaeger
BY
ATTORNEY Patented Mar. 7, 1933

1,900,382

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC APPARATUS

Application filed February 23, 1928. Serial No. 256,189.

This invention relates to process and apparatus for catalytic reactions and more particularly to process and apparatus for catalytic reactions which are highly exothermic or require a very delicate temperature control.

Many reactions such as the catalytic oxidation of some organic compounds result in the production of large amounts of heat and tend to become uncontrollable for when the reaction temperature rises there is a tendency for the reaction to proceed too far with great increases in exotherm so that one may consider the reaction as in unstable equilibrium. Many other reactions such as, for example, certain organic reductions may not be so strongly exothermic but require a very delicate temperature control for best results.

In the past, reactions which are delicate or strongly exothermic have usually required the use of converters in which the catalyst is cooled by means of liquid baths and the most effective type has usually been that in which the catalyst is distributed in small zones, frequently tubes surrounded by a single bath. In the past bath converters of two types have been used—those provided with baths which do not boil and those which boil at or about reaction temperature. The former present many advantages in that the choice of bath liquid is very large and in the case of converters used for high temperature reactions cheap baths, such as molten salt baths, molten lead baths, and the like, may be used. Converters provided with a non-boiling bath, however, have in many cases proved inadequate to control delicate or highly exothermic reaction at high loadings with the desired degree of accuracy and have also frequently required rather careful and constant supervision to regulate the cooling. For this reason boiling bath converters were used, in which, of course, the temperature regulation is entirely automatic and the heat capacity of the bath due to the high latent heat of vaporization is so great that even sharp increases in exotherm can be satisfactorily controlled. This has rendered boiling bath converters preferable for many highly exothermic reactions such as organic oxidations and they present, of course, a great advantage of automatic temperature regulation and tremendous temperature controlling capacity.

Boiling bath converters, however, are subject to a number of very serious disadvantages especially for reactions which take place at high temperatures. For such reactions only a few liquids come into consideration, such as sulfur, mercury, mercury alloys and the like. Mercury and its alloys have proven to be very satisfactory but they are very expensive and as the fumes of mercury are extremely poisonous extraordinary care must be used in order to assure that all the joints are gas-tight. Sulfur, of course, is open to the serious objection that it attacks most metals at high temperatures.

The cooling effected by boiling liquids is frequently accompanied by the formation of vapor bubbles on the walls of the catalyst containing chambers. These bubbles temporarily insulate the catalysts from the bath, resulting in non-uniform cooling, and this also causes violent knocking which shortens the useful life of the converters to a marked degree. Many boiling liquids for high temperature reactions, such as mercury and alloys rich in mercury, or sulfur, possess relatively low heat conductivity which is an additional serious disadvantage and prevents uniform temperature control. In downflow converters, which are used most extensively at the present time, the most intense reaction takes place in the upper portion of the tubes and where a boiling liquid of low heating capacity is used the top portions of the liquid may be actively boiling and the lower portions may be relatively cold, for with poor heat conductivity convective circulation is greatly decreased.

The present invention combines the advantages of both boiling and non-boiling types of converters, and does not possess the disadvantages of either. The converters of the present invention are provided with a bath which has a boiling point far above reaction temperatures. Elements of moderate size, which are strongly cooled, and which may be metal rods of high heat conductivity extending beyond the bath, or compartments provided with liquids which either boil at about reaction temperature or sufficiently near to it so that great temperature increases will start ebullition, are distributed through the bath. Compartments may, of course, also be filled with liquids of high heat conductivity, or which by reason of the design of the element permit rapid circulation thus removing heat from the bath. In many cases these auxiliary compartments are distributed throughout the bath in such a way as to reach its central portion and effect cooling of the parts which are difficult to control in the ordinary converters using a non-boiling bath. The advantages of high cooling capacity, which are possible with boiling bath converters, are therefore fully enjoyed by converters of the present invention, and the inherent disadvantages are not present even where the cooling elements contain liquids which boil at reaction temperature, for in the first place the amount of these liquids is very small compared with the total amount of bath and even when expensive do not greatly increase the cost of the bath. Bubble formation and knocking are also unobjectionable, for the large quantity of non-boiling bath surrounding the catalyst chambers and the heat control elements equalizes any local non-uniform cooling caused by the formation of bubbles in the boiling liquid compartments, and these latter need not be rigidly attached to the converter structure so that the shock produced by knocking need not be transmitted in its full severity to the converter structure, or even when the cooling elements are rigidly connected to the converter structure, as is desirable in some cases, the amount of liquid contained in them is relatively much smaller than a boiling bath in a converter, and the knocking is correspondingly reduced in violence with the concomitant diminution of damage to the converter structure.

In the converters of the present invention the non-boiling bath, may be either purely a flowing heat transfer means to the cooling elements, either solid or liquid containing compartments boiling or non-boiling, or the cooling elements may be used only to compensate for fluctuations or variations in reaction exotherm. The nature of the final cooling, whether wholly by the cooling elements or partly by them and partly by the non-boiling bath itself, will be chosen in accordance with the requirements of the particular installation. While the present invention includes as one of its most important embodiments the use of cooling elements consisting in liquid containing compartments distributed throughout or associated with the non-boiling bath, solid elements are of equal importance in many cases, and are shown, for example, in Figs. 1 and 13 of the drawings. Cooling elements, either solid or liquid, boiling or non-boiling, may also be in direct contact with the catalyst, as is shown for example in Figs. 8 and 9 of the drawings, but the invention does not include converters in which the whole of the cooling elements are in direct contact with the catalyst itself. The equalization of temperature throughout the non-boiling bath may result purely from the ordinary circulation of the latter due to difference of heat evolved in various portions of the converter although in some of the preferred embodiments of the invention, for example those shown in Figs. 2, 7, 11, and 13, positive circulation of the non-boiling bath may be employed and for many highly exothermic reactions this method is of great importance and might be considered to constitute the preferred embodiment of the present invention for reactions requiring extremely powerful and sensitive temperature control. A portion of the cooling elements, or the vapor spaces thereof, when they are provided with boiling liquids, may be exposed to the air, to fresh incoming gases, or partly or wholly to reacted gases, which are recirculated, as of course the principles of the present invention may be applied to converters operating with recirculation of part or all of the gas in order to provide an additional control in highly sensitive reactions and to increase the yield in many equilibrium reactions. It is also advantageous in some cases to provide for a partly or wholly closed circuit gaseous cooling system to control the temperature of the cooling elements, and in the case of cooling elements provided with boiling liquids to effect condensation of the vapors. Liquid cooling means may of course be used instead of gas cooling as is shown in Fig. 7 of the drawings, and are applicable to solid cooling elements or to cooling elements filled with a non-boiling liquid as well as to cooling elements provided with boiling liquids as illustrated in the figure. This cooling means may be of any suitable type and may, for example, constitute a steam boiler, the heat absorbed being utilized to raise steam. Such cooling means have been used in conjunction with boiling bath converters and suitable construction will, of course, be used by the skilled engineer. Obviously, of course, more than one method of condensing the vapors from the boiling liquids may be used.

While for most delicate reactions it is desirable to utilize a boiling liquid which boils at a temperature sufficiently below the reaction temperature so as to automatically maintain the desired temperature of the non-boiling bath for some reactions which are not so highly exothermic but which present some dangers of getting out of control it may be desirable to depend primarily on the cooling of the non-boiling bath as a primary cooling means, using the temperature regulating effect of the boiling liquid compartments as an emergency measure or safety valve. Thus, for example, if a reaction is carried out normally at a temperature that requires the bath to be maintained at approximately 400° C., this can be effected by cooling the bath in any suitable manner and compartments may be disposed throughout the bath containing a liquid that boils, say, at 420°. In such a case during normal operation the liquid in the separate compartments will not boil and the non-boiling bath will control the reaction but if for any reason the reaction should get out of control and the temperature should rise sharply so that the bath became heated above 420° C. the liquid in the compartments would begin to boil and would control further temperature increases, acting thus as a safety valve. The present invention, of course, includes converters in which the bath tempering means act either as normal temperature regulators or as emergency regulators or safety valves.

It should be clearly borne in mind that the present invention does not employ as its primary cooling means the principles of a boiling bath converter in which the boiling liquid is in heat exchanging relation with the contact mass. On the contrary in some modifications of the present invention the latent heat of vaporization of boiling liquids is not to control the temperature of the catalyst but to control the temperature of the bath, an entirely different method of control. This is perhaps most strongly brought out and most clearly illustrated in Figs. 7, 11 and 13 where the temperature regulation of the bath takes place outside of the converter. While in certain figures of the drawings some boiling liquids of the compartment are in direct heat exchanging relation with the contact mass, this effects only a secondary or minor cooling.

In the foregoing general description of the present invention the emphasis has been laid on exothermic reactions and this field presents perhaps the most striking incidents of the advantages of the temperature control possible by means of the present invention. It should be clearly understood, however, that the invention is equally applicable to reactions which are weakly exothermic or are endothermic and, therefore, require the application of external heat. It is just as important to maintain a uniform temperature in many endothermic reactions as it is in exothermic reactions although perhaps this requirement is not as strikingly shown in the former class as the disastrous results of lack of control in strongly exothermic reactions are somewhat more spectacular in their violence.

The present invention while it finds perhaps its most important field of usefulness in the control of organic oxidations is nevertheless generally applicable to all vapor phase catalyses both exothermic and endothermic involving organic and inorganic materials. The following list of representative reactions of different classes is not intended in any sense to limit the scope of the invention but will serve as an indication of a few representative classes of reaction in which the important temperature control features of the present invention may be effectively utilized.

Converter systems embodying the principles of the present invention are applicable to the most varied types of organic oxidations, such as, 1. Reactions in which an intermediate oxidation product is produced. The oxidation of benzol, toluol, phenol, tar phenols or furfural and other compounds containing the group —$CH_2$—$CH$=$CH$—$CH_2$— to maleic acid and fumaric acid or mesotartaric acid; cresol to salicylaldehyde and salicylic acid; toluol and the various halogen and nitro substituted toluols to the corresponding aldehydes and acids; xylenes, pseudocumene, mesitylene, paracymene and other derivatives to the corresponding aldehydes and acids; naphthalene to naphthaquinone, phthalic anhydride and maleic acid; phthalic anhydride to maleic acid and fumaric acid; anthracene to anthraquinone; phenanthrene to phenanthraquinone, diphenic acid, phthalic anhydride and maleic acid, acenaphthene to acenaphthylene, acenaphthaquinone, bisacenaphthylidenedione, naphthaldehydic acid, naphthalic anhydride and hemimellitic acid; fluorene to fluorenone; eugenol and isoeugenol to vanillin and vanillic acid; methyl alcohol and methane to formaldehyde; ethyl alcohol to acetic acid; ethylene chlorhydrine to chloracetic acid and the like.

2. Reactions in which an undesired impurity is burned out, such as the purification of crude anthracenes of various degrees of impurity with total combustion of carbazole, dead oils and in some cases phenanthrene; purification of crude naphthalenes and crude mononuclear hydrocarbons, such as benzols and the like; purification of ammonia from coal tar with the burning out of the organic impurities such as phenolic bodies present, etc.

3. Oxidation of mixtures of organic compounds to desired intermediate products with removal of impurities such as the oxidation of crude anthracenes, phenanthrenes, and the like to intermediate products such as anthraquinone, phenanthraquinone, diphenic acid, phthalic anhydride, and the like with concomitant removal of carbazole and dead oils by total combustion; the oxidation of crude tar acids to maleic and fumaric acids with the combustion of certain impurities, etc.

Reductions and hydrogenations, such as, reducing nitro compounds, for example nitrobenzene, dinitrobenzene, nitrophenol, nitronaphthalene and their homologues to the corresponding amines or the corresponding hydrogenated amines, the reduction of aldehydes and ketones to alcohols, such as benzaldehyde to benzyl alcohol, acetaldehyde to ethyl alcohol, crotonaldehyde to the corresponding butyl alcohol, and the like, the reduction of oxides of carbon to methanol, methane, higher alcohols and ketones or petroleum like products, the hydrogenation of aromatic compounds to alicyclic compounds such as benzene to cyclohexane, naphthalene to tetraline or decaline, anthracene to hydrogenated anthracenes, phenol to cyclohexanol, acetylene to ethylene and ethane, and the like, polybasic acids to inner esters, such as phthalic anhydride to phthalid, camphoric acid to campholid, and the like, reduction of nitrogen containing heterocyclic compounds to aliphatic amines such as phridine to amylamine are also of importance.

In addition to reactions in which a more or less homogeneous raw material is reduced certain mixtures of raw materials may be effectively reduced with or without the presence of additional reducing gases. Thus for example, oxides of carbon may be reduced in the presence of the vapors of many organic compounds. For example, they may be reduced in the presence of aliphatic hydrocarbons, such as paraffins, olefines, acetylenes, hydrocarbons having the formula $C_nH_{2n-4}$, $C_nH_{2n-6}$, etc. Hydrogen may be present or absent, and the class of products obtained, such as mixtures of oxygenated compounds, or in many cases oils which are predominately hydrocarbon in their nature, will vary with the amount of the reacting ingredients and with the contact masses and reaction conditions used, and it is an advantage of the present invention that these novel combined reductions can be carried out in the desired direction with great effectiveness by the incorporation of suitable stabilizer promoters or stabilizers in the contact masses.

Another class of combined reaction consists in the reduction of oxides of carbon with or without hydrogen in the presence of vapors of aliphatic alcohols, such as paraffin alcohols having the formula $C_nH_{2n}OH$, or unsaturated alcohols having the formula $C_nH_{2n-1}OH$, or $C_nH_{2n-3}OH$, etc. Polyvalent alcohols such as glycol, glycerol and the like, may be reduced in combination with oxides of carbon with or without hydrogen.

Oxidation products of alcohols, such as for example, saturated or unsaturated aldehydes and ketones, or oxidation products of polyvalent alcohols, such as glycolaldehydes, glyoxal, glyoxylic acid, oxalic acid, and the like, may be used for vapor phase reductions in the presence of oxides of carbon and hydrogen. Oxidation products of trivalent alcohols and divalent isomeric alcohols may also be used, of course only where it is possible to obtain the vapors of the compounds without undesired decomposition.

Aliphatic acids form another important class of compounds which can be reduced in combination with oxides of carbon. The acids include fatty acids, oxyacids, lactones, polybasic acids, ketone acids, and the like. Other miscellaneous aliphatic carbonyl compounds such aldehyde alcohols, diketones, triketones, oxymethylene ketones, ketone aldehydes, ketone alcohols and the like, may also be combined with oxides of carbon and reduced in the presence of the contact mass described above to form many valuable products.

In addition to compounds of the aliphatic series which may be reduced together with oxides of carbon, various compounds of the alicyclic series, such as for example, alicyclic compounds, for instance, cycloparaffins, cycloolefines, cyclodiofines may be combined with oxides of carbon and reduced. Examples of specific members of this class are cyclohexane, cyclopentadiene, dicyclopentadiene, and the like. Of course alicyclic carbonyl compounds, such as cyclohexanol, cyclohexanone, etc., may be used, it being understood in this connection and throughout the specification that any compound containing the CO group, irrespective of whether the oxygen is united to carbon with a single or a double bond, are included under the term carbonyl compounds.

Aromatic compounds, such as benzene hydrocarbons, naphthalenes, anthracenes, phenanthrenes, phenols, aromatic alcohols, aldehydes, ketones and acids may be reduced in the presence of oxides of carbon and hydrogen, of course only insofar as the products are capable of volatilization without undesired decomposition.

Heterocyclic compounds, such as products containing the furane nucleus, pyrrole bodies, pyrrolidines and the like, may be reduced together with oxides of carbon.

The invention also may be applied to other vapor phase organic reactions such as the splitting off of carbon dioxide, for example, the transformation of polycarboxylic acids or their anhydrides into monocarboxylic acids, as for instance the production of benzoic acid from phthalic anhydride. Dehydrations of all kinds, such as the production of ethers or unsaturated hydrocarbons from alcohols, for example, ethylene from ethyl alcohol, can be effectively carried out.

A large number of reactions involving molecular associations such as polymerizations and condensations for example, the so-called aldolizations and crotonizations of aldehydes and the like constitute an important field of catalytic reactions for which the present invention is well suited. Catalytic halogenations of organic compounds form another field in which the present invention can be effectively used. Catalytic esterifications form a category of reactions in which long and repeated contact with the catalyst is of importance and can be effectively carried out by means of converters of the present invention.

In the inorganic catalytic field synthesis of ammonia and oxidation of ammonia to nitrogen oxides are effectively carried out in converter systems embodying the temperature control features of the present invention and particularly converters provided with automatic gas cooling for it is an advantage of this type of construction that heat exchange elements do not have to be gastight which lends this type of converter construction for extremely high pressure work such as, for example, high pressure ammonia synthesis, organic reductions and hydrogenations, for example, the reduction of oxides of carbon, etc. Hydrocyanic acid can also be catalytically produced from carbon monoxide and ammonia in converter systems of the present invention and the effective and simple temperature control which they assure is of importance in improving yields and increasing outputs in this reaction. Other reactions which can be effectively carried out in converters of the present invention are the catalytic oxidation of sulfur dioxide to sulfur trioxide, the catalytic water gas process, and catalytic purification of gases.

In the drawings

Fig. 4 is a vertical section through a tubular converter of the general type shown in Fig. 1 but provided with a closed circuit gaseous cooling system for the boiling liquid compartments.

Figs. 5 and 6 are detailed vertical sections through modified forms of cooling elements;

Fig. 8 is a vertical section through a converter having a gaseous cooling circulation similar to that in Fig. 4 but being further provided with additional liquid compartments in direct contact with the catalyst in the tubes;

Fig. 11 is a vertical section through a tubular converter provided with non-boiling bath and an external cooling compartment provided with liquid chambers with gas cooling;

Fig. 12 is a horizontal section along the line of 12—12 of Fig. 11; and

Fig. 13 is a vertical section through a converter of the type shown in Fig. 11 but provided with solid temperature equalizing means in the non-boiling bath.

Figure 1:
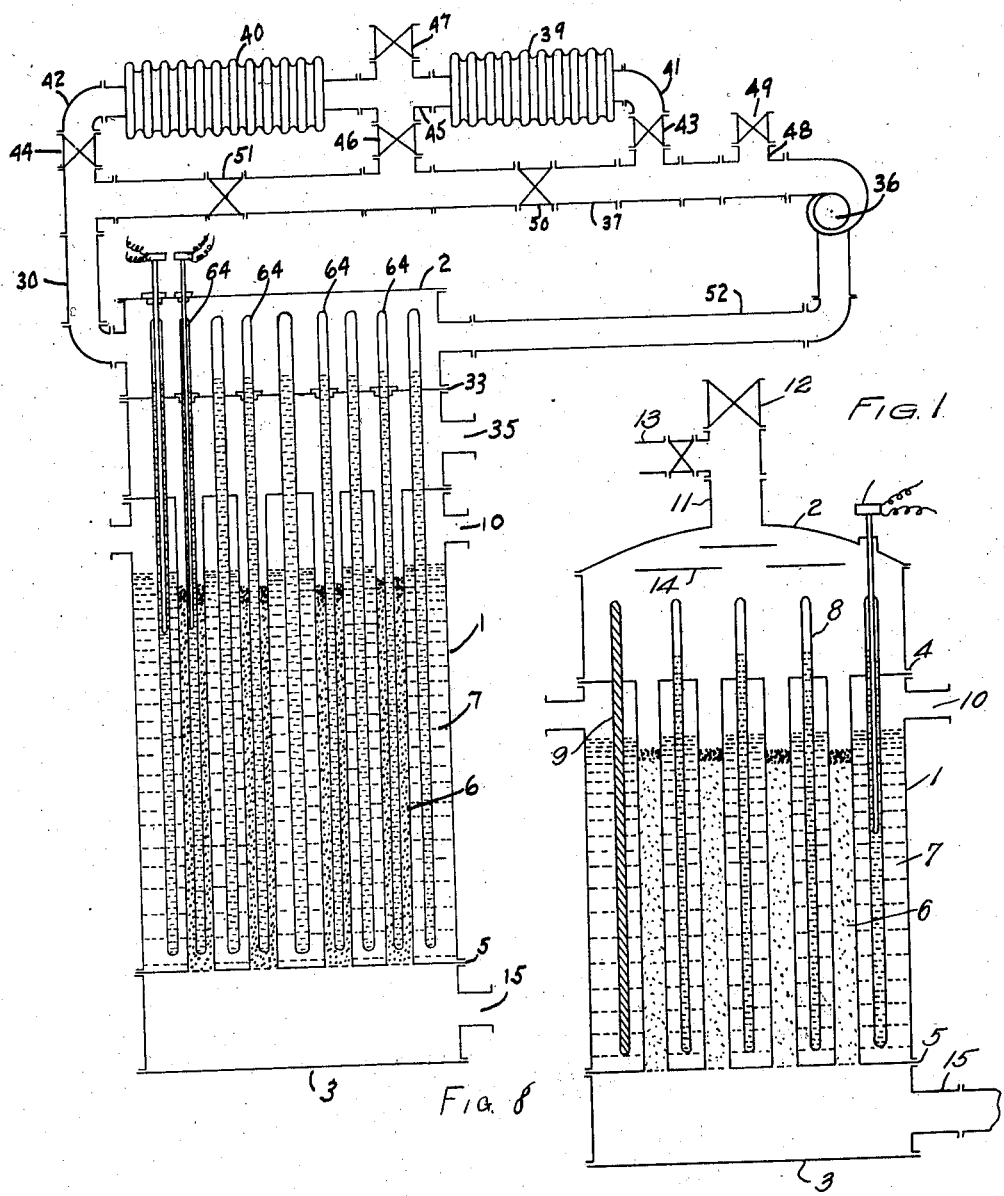
Fig. 1 is a vertical section through a simple tubular converter provided with a non-boiling bath and interspersed compartments containing boiling liquids.

In the construction shown in Fig. 1 the converter consists of a shell 1, top piece 2, bottom piece 3, top and bottom tube sheets 4 and 5, and catalyst tubes 6. A non-boiling bath 7 surrounds the catalyst tubes and is provided with compartments 8 containing a liquid and extending through the tube sheet 4. A solid metal temperature equalizing element is also shown at 9 and may, of course, be interspersed with the liquid temperature means. The non-boiling bath compartment is provided with suitable vent pipes 10 and thermocouples are immersed in the boiling liquid of some of the compartments 8. Reaction gases enter the top piece 2 through the pipe 11 controlled by the valve 12 and provided with a valved pipe 13 where a plurality of gases are to be introduced. The gases are distributed by means of the baffles 14 and flow over the vapor spaces of the compartments 8, pass down through the catalyst tubes into the bottom space defined between the bottom piece 3 and the lower tube sheet 5, thence leaving through the exhaust pipe 15. Cooling is primarily effected by the converter shell which may be air cooled and the final control of the temperature of the bath 7 is effected by the liquids in the compartment 8 which may preferably boil at about reaction temperature. The vapors in these compartments are in turn condensed by contact with the cold or cool reaction gases and serve to heat up the latter to the desired reaction temperature. It should be clearly understood that the drawings are purely diagrammatic in nature and do not show structural details, such as insulation and the like, which form no part of the present invention and which are well known to the skilled chemical engineer.

Figure 2:
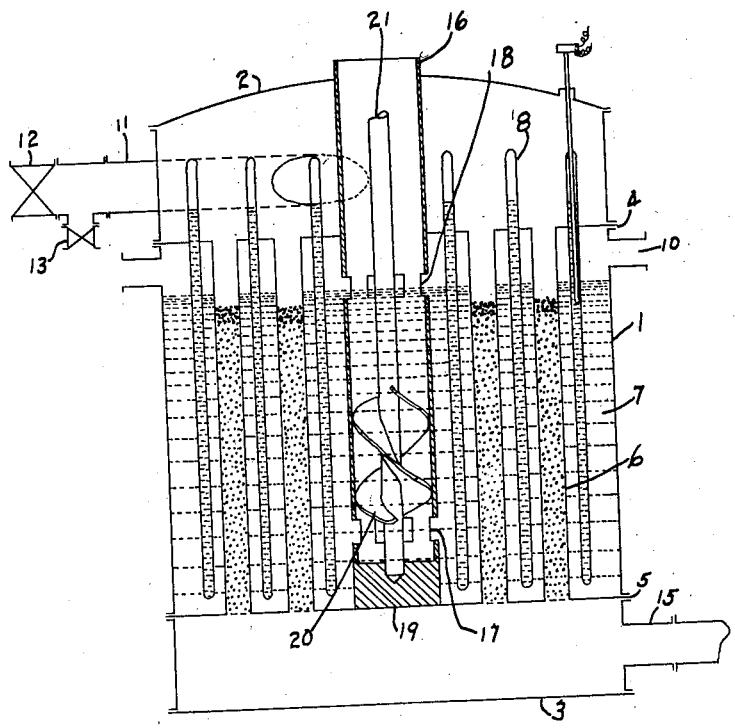
Fig. 2 is a vertical section through a tubular converter somewhat similar to that in Fig. 1 but provided with mechanical internal circulation of the non-boiling bath.

Fig. 2 illustrates a converter somewhat similar in its general design to that in Fig. 1 provided with a non-boiling bath surrounding the catalyst tubes and containing compartments of boiling or non-boiling liquid. A central well 16 extends from near the bottom of the non-boiling bath up through the top piece of the converter. This well is provided with suitable openings 17 at its lower end and 18 at its upper end and rests on a bearing block 19. A screw propeller 20 turns in the well, the shaft 21 extending beyond the converter, and forces the non-boiling bath to circulate. The circulation may be in either direction but since the tendency is for the bath to heat up in contact with the catalyst tubes it will usually be found desirable to circulate the bath down through the well 16. Such a circulation will be assisted by natural difference in gravity but either type of circulation may be used.

The converter shown in Fig. 2 is very much more efficient than that shown in Fig. 1 where strongly exothermic reactions are carried out because the vigorous circulation of the non-boiling bath is the best assurance of uniformity of temperature throughout. The converter is shown without directing baffles for the circulation of the non-boiling bath but where desired suitable directing baffles may be incorporated if this is found to be desirable in order to enhance the uniformity of temperature control.

Figure 3:
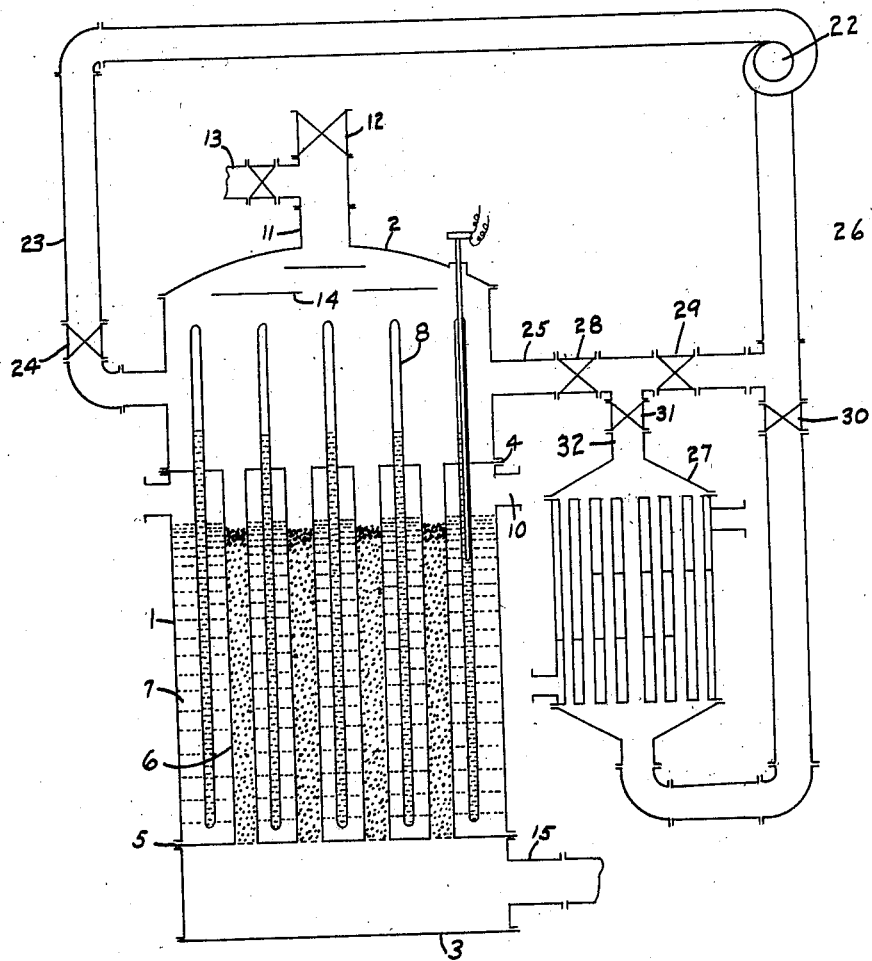
Fig. 3 is a vertical section through a converter similar to Fig. 1 provided with a continuous circulation of reaction gases over the vapor spaces of the liquid compartments.

Fig. 3 illustrates a converter similar to Fig. 1 but provided with a recirculation of reacting gases before the latter pass through the catalyst, thus increasing the amount of gases passing over the vapor spaces of the boiling liquid compartments. This recirculation consists in a pump 22 which forces gas through the pipe 23 controlled by the valve 24 into one side of the upper compartment of the converter, whence the gas flows over the vapor spaces of the compartment passing out through the pipe 25, whence it can flow through the pipe 26 back to the pump. The gases may, however, be caused to flow through the heat exchanger 27, which is shown as of the ordinary tubular type. The proportion of gases flowing through the heat exchanger will be determined by the setting of the valves 28 and 29 in the pipe 25, the valve 30 in the pipe 26, and the valve 31 in the branch pipe 32 which leads from the pipe 25 to the heat exchanger 27. Fresh gases enter as usual through the pipe 11.

Not only does this construction of Fig. 3 provide for and markedly enhance the cooling effect of the boiling cooling compartments but a very thorough mixing of the reaction gases is made possible by the pumping around and this is desirable in many reactions.

In Fig. 4 a converter of the general design of Fig. 1 is shown but is provided with a perforated partition 33 above the upper tube sheet 4 provided with catalyst charging holes closed by plugs 34. The tops of the boiling liquid compartments 8 extend through the partition 33, suitable care being taken to effect a tight joint. Reaction gases enter the compartment defined between the compartment 33 and the upper tube sheet 4 through the pipe 35 and flow through the converter in the usual manner. Cooling of the vapor space of the compartment 8 is effected by directing a blast of cold gas over them. Gas is forced by the pump 36 through the pipe 37 into the pipe 38 with or without passing through the finned or corrugated pipes 39 and 40 which are connected to the pipe 37 through the pipes 41 and 42 respectively, the latter being provided with valves 43 and 44. An additional connecting pipe 45 runs from the junction of the two coolers 39 and 40 to the pipe 37 and is provided with a valve 46. This pipe also extends in the form of a T and gases from an external source may be introduced therethrough, this introduction being controlled by the valve 47. A similar introduction into the pipe 37 immediately after the pump discharge is effected through the branch pipe 48 controlled by the valve 49 and valves 50 and 51 are mounted in the pipe 37 on each side of the joint where the pipe 45 enters. Pipe 52 connects the converter cooling space with the intake of the pump or blower 36. It will be evident that the circulating gases may be passed either through the cooler 39 or the cooler 40 or both or part or all of the gases may be by-passed around either or both coolers through the pipe 37. The proper manipulation of the various valves is self-evident. By these means extremely accurate temperature control can be effected and of course may be automatically effected in accordance with temperature changes through suitable relays where this may be desirable. This type of converter is well suited for carrying out highly exothermic reactions which, however, require that the reaction gases enter the catalyst at a fairly high temperature and particularly a uniform temperature. This is readily possible by providing an entirely separate and independent cooling means for the boiling liquid compartments, which cooling means depends in no way on the amount or temperature of the reaction gases flowing over the boiling liquid compartments. The converter system is, of course, applicable to other types of reaction where the more positive and definite temperature control possible in this modification is of importance. Solid rods or compartments containing non-boiling liquids may also replace the boiling liquid compartments 8.

Figs. 5 and 6 illustrate modified types of liquid compartments. In the modification shown in Fig. 5 an inner circulating tube 53 is provided, preferably carrying perforations at its lower end. A rapid circulation of the liquid is thereby effected which tends to prevent vapor locking or uneven ebullition. Fig. 6 illustrates a boiling liquid compartment provided with a jacket 54 provided with a non-boiling liquid 55. This type of compartment will not boil in response to momentary fluctuations of temperature of the non-boiling bath and is desirable for certain types of converters especially where the cooling effect of the boiling liquids is used primarily as a safety valve. Other modifications of boiling or non-boiling liquid compartment construction are, of course, included, and will be clear to the skilled engineer.

Figure 7:
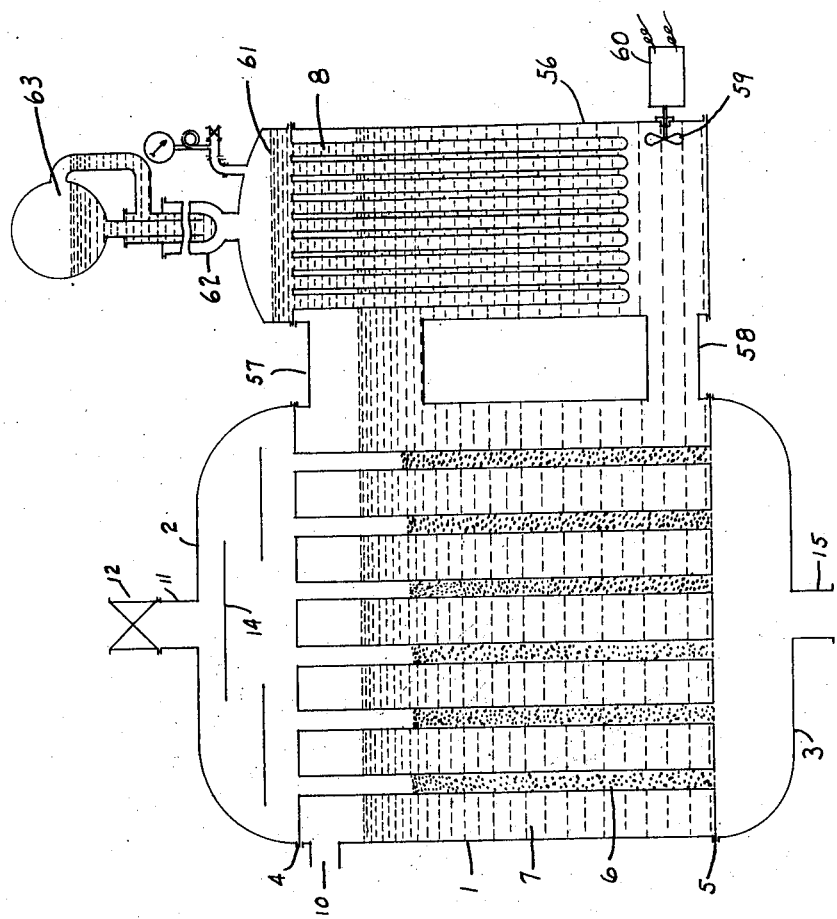
Fig. 7 illustrates a converter of the general design of Fig. 1, but provided with liquid cooling of the vapor spaces of the boiling liquid compartments.

Fig. 7 illustrates a converter provided with a non-boiling bath and with an adjacent cooling chamber 56 connected to the converter through passages 57 and 58 respectively, the former entering at the upper level of the non-boiling bath and the latter approximately at the bottom. The non-boiling bath freely circulates through the chamber 56, being impelled by the propeller 59 driven by the motor 60. The circulation is, of course, from the chamber 56 through the passage 58 into the converter and back through the passage 57. The parts of the converter, of course, bear the same reference numerals as in the foregoing figures. In the chamber 56 are provided cooling elements 8 which are shown as filled with a boiling liquid and connected at their upper ends to tank 61 in which the boiling liquid is maintained at a more or less definite level. From the vapor space of this tank the vapors are caused to flow into the condenser 62 cooled by water from a steam boiler 63, in which condenser they are condensed producing steam and the condensate flows back into the tank 61. This construction assures a uniform distribution of liquid to all of the tubes 8 but where desired, of course, a liquid level can be maintained in the tubes. The steam boiler is shown merely diagrammatically and any suitable construction may be used.

The arrangement of Fig. 7 is highly effective as positive forced circulation of non-boiling bath is obtained and the temperature is regulated to a nicety by the boiling of the liquid in the cooling elements 8. The latter also do not have to be mounted directly in the converter which greatly simplifies its mechanical construction and the ease with which catalysts can be charged into it. Such a construction possesses many advantages from an operating standpoint but is, of course, less compact than some of the other designs. The converter is shown purely diagrammatically but in practice it may be desirable to provide suitable baffling in order to distribute the flow of non-boiling bath over the various tubes to assure uniform cooling throughout the converter. Of course, where desired, more than one external cooling zone may be provided wherever the advantage of somewhat greater uniformity of cooling justifies the additional complication. The forced mechanical circulation, of course, may be dispensed with but only at a considerable sacrifice of cooling uniformity as the normal convection circulation is too slight to provide adequate and uniform cooling with very highly exothermic reactions or reactions where considerable fluctuations of exotherm are unavoidable.

The type of converter shown in Fig. 7 is also well suited for endothermic reactions as it is, of course, readily feasible to externally or internally heat the chamber 56, the bath being maintained at a uniform temperature by boiling the liquid in tubes 8 and the hot bath is then circulated through the converter where it is cooled by the endothermic reaction taking place therein. In such a case, of course, the direction of circulation should naturally be reversed as will be self-evident to the skilled engineer and such slight modification of construction adapting the invention for use in endothermic reactions will be made in any particular installation and are, of course, included within the scope of the invention.

Figure 9:
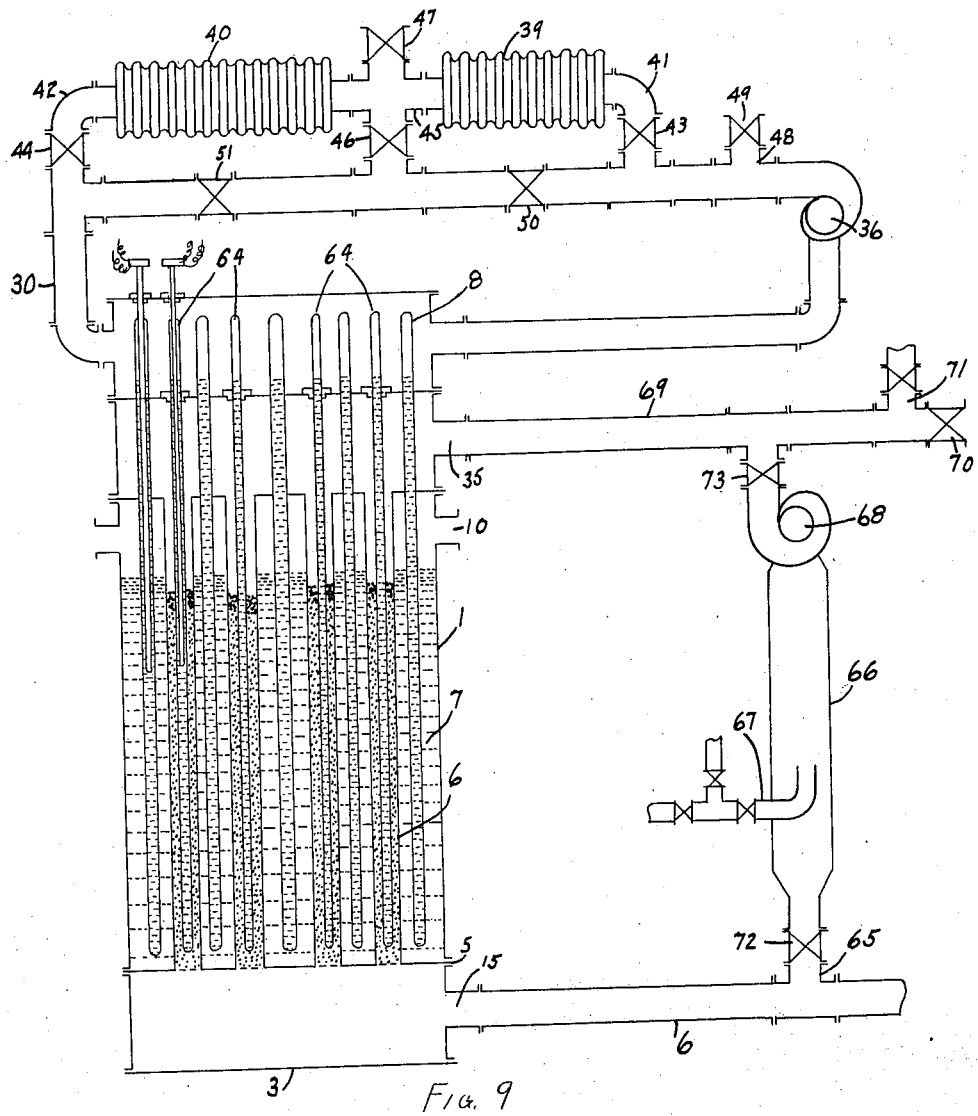
Fig. 9 is a vertical section through a converter similar in design to that of Fig. 8 but provided with recirculation of reacted gases.

Fig. 8 illustrates a converter substantially the same as that shown in Fig. 4, similar parts bearing like reference characters, except that it is provided with some of the temperature regulating elements 64 passing directly into the catalyst tubes, and being in direct heat exchanging contact with the catalyst, thereby providing an additional control of reaction Fig. 9 shows a converter of the design of that of Fig. 8 but provided with partial recirculation of the reacted gases. The recirculation is effected by causing a smaller or larger amount of the gases from the exhaust pipe 6 to pass through the branch pipe 65 into the mixing chamber 66 where additional fresh gases may be introduced through the pipe 67, thence flow to the suction of the blower 68 which forces the gases into the pipe 69 leading to the intake of the converter. Additional fresh gases may be introduced directly into the pipe 69 through the valve 70 or through the valved pipe 71. The proportionate amount of recirculation may be regulated by suitable adjustment of the valve 72 in pipe 65 or the valve 73 in the discharge of the blower. The operation of the gas cooling circuit is, of course, identical with that shown in Figs. 4 and 8.

Figure 10:
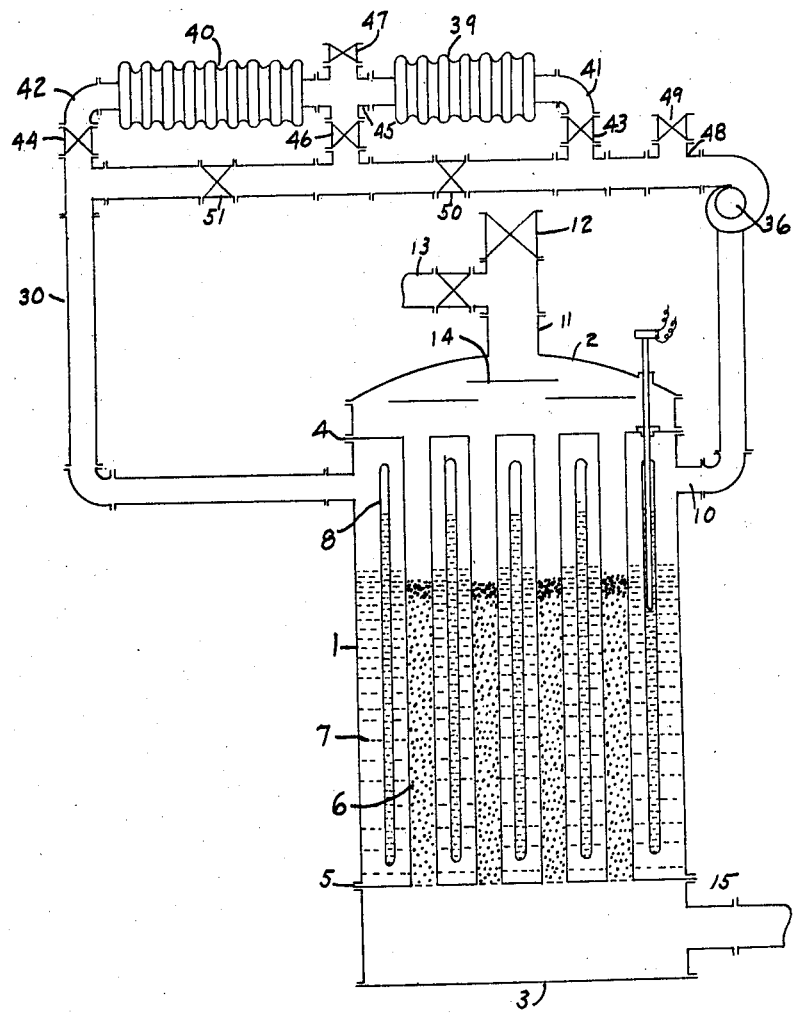
Fig. 10 is a vertical section through a converter provided with closed circuit gaseous cooling system which also circulates any vapors of the non-boiling bath formed.

Fig. 10 illustrates a converter provided with closed circuit gas cooling means operating as in Figs. 8 and 9 but instead of the cooling gases flowing over the extended cooling elements a converter construction is used in which the cooling elements do not extend through the partition 4 and, therefore, the gas blast flows under the latter in the vapor space above the non-boiling bath. This permits a more compact construction and the cooling elements do not extend above the partition 4 and therefore do not interfere with filling in catalysts. The reaction gases are also not brought into contact with the cooling elements and, therefore, enter the catalysts at a temperature not differing greatly from the entrance temperature. This is an advantage in some cases where it is undesirable to heat up the reaction gases before they contact with the catalyst. In a construction as in Fig. 10 it should be borne in mind, of course, that the gas in the cooling circuit contacts with the surface of the non-boiling bath and care should, therefore, be taken that the bath is not attacked thereby by suitably choosing the bath and gases used.

Figs. 11 and 12 illustrate a converter operating precisely as in Fig. 7, like parts, of course, bearing like numerals, but instead of providing water cooling or vapors from the elements 8, the latter extend up into the gas chamber 74 into which the gas enters from the tube 75 after passing over the tops of the cooling elements flows through pipe 76 into the intake pipe 11 of the converter. Part or all of the reaction gases may enter in this manner and be suitably preheated by the heating elements 8. These latter may, of course, be solid or contain liquids, either boiling or nonboiling, the type chosen depending on the reaction to be controlled. This construction is very economical of heat and may advantageously be used in reactions in which it is necessary to heat up the reaction gases to a relatively high temperature before the latter pass through the contact mass.

Fig. 13 illustrates a converter of the type shown in Figs. 11 and 12 but provided with solid cooling elements 77 in the non-boiling bath in the converter. These solid elements, which are preferably of high heat conductivity, serve to effect a very uniform heating and in some cases where the non-boiling bath is relatively expensive or relatively heavy, considerable quantities may be used in order to save bath or to save weight. A marked increase in uniformity and effectiveness is obtained which is desirable for many exothermic or delicate reactions which can be effectively carried out in converters of this type. Of course, instead of solid elements, elements containing liquids, preferably non-boiling, may be used. It is also desirable in some cases to use cooling elements placed horizontally instead of vertically or both types of elements may be employed wherever suitable. The horizontal elements may also be in the form of, or perform the function of baffles in order to achieve a more uniform flow of non-boiling bath over all of the catalyst tubes. It will be clear, of course that this modification may also be applied to converters such as that shown in Fig. 7.

What is claimed as new is:

1. A converter comprising in combination a plurality of catalyst containing compartments, a normally non-boiling bath liquid at operating temperature surrounding them, heat exchange elements in heat exchanging relation with the bath in contact with such bath and extending above the level thereof and means for subjecting the protruding portions of the heat exchange elements to tempering media.

2. A converter according to claim 1 in which at least part of the heat exchange elements consist of compartments partially filled with liquids which boil at temperatures not far from reaction temperature, the liquid in said compartments extending at least as far as the upper surface of the non-boiling bath.

3. A converter containing a normally non-boiling bath in which is liquid at operting temperatures, a plurality of catalyst containing compartments in one portion of said converter and surrounded by said bath, a portion of said converter remote from the catalyst containing compartments and separated therefrom by baffling means but communicating with the portion of the converter containing the catalyst compartments at top and bottom, the bottom portion of the top communication being below the upper surface of the non-boiling bath, heat exchange elements in heat exchange relation with the bath in the portion of the converter remote from the catalyst containing compartments, said heat exchange elements containing portions out of heat exchange relation with the non-boiling bath, and a liquid having a boiling point materially below the operating temperature of the non-boiling bath in the heat exchange elements in heat exchange relation with the non-boiling bath, the ratio of surface of said heat exchange elements to the volume of liquid contained therein being sufficiently great so that the liquid boils when the non-boiling bath is at operating temperatures.

4. A converter according to claim 3, in which the non-boiling bath is a substance which is a solid at ordinary room temperature.

5. A converter according to claim 3, in which the non-boiling bath is a solid at ordinary room temperatures and means are provided for mechanically circulating the non-boiling bath between the catalyst containing compartments and the remote zone.

6. A converter comprising in combination a plurality of catalyst containing compartments, a normally non-boiling bath liquid at normal operating temperatures surrounding said compartments, a portion of the converter separated from the catalyst containing compartments by baffling means but provided with connecting means with the top and bottom of the portion of the converter containing the catalyst compartments, the lowest part of the top connection being below the level of the non-boiling bath, heat exchange elements in said remote portion, said heat exchange elements having a portion in heat exchange relation with the non-boiling bath and a portion out of heat exchange relation therewith.

Signed at Pittsburgh, Pennsylvania, this 16th day of February, 1928.

ALPHONS O. JAEGER.